(12) United States Patent
Feng (10) Patent No.: US 10,315,618 B2
(45) Date of Patent: Jun. 11, 2019

(54) BELT PRETENSIONER

(71) Applicant: Zhide David Feng, Northville, MI (US)

(72) Inventor: Zhide David Feng, Northville, MI (US)

( * ) Notice: Subject to any disclaimer, the term of this patent is extended or adjusted under 35 U.S.C. 154(b) by 55 days.

(21) Appl. No.: 15/259,714

(22) Filed: Sep. 8, 2016

(65) Prior Publication Data

US 2016/0375859 A1 Dec. 29, 2016

Related U.S. Application Data

(63) Continuation-in-part of application No. PCT/CN2015/074039, filed on Mar. 11, 2015.

(60) Provisional application No. 61/967,139, filed on Mar. 11, 2014.

(51) Int. Cl.
*B60R 22/195* (2006.01)
*B60R 22/46* (2006.01)

(52) U.S. Cl.
CPC ...... *B60R 22/4633* (2013.01); *B60R 22/1951* (2013.01); *B60R 22/1952* (2013.01); *B60R 22/1954* (2013.01); *B60R 22/1955* (2013.01); *B60R 22/4619* (2013.01)

(58) Field of Classification Search
USPC .......... 280/806; 242/374; 297/480; 102/530
See application file for complete search history.

(56) References Cited

U.S. PATENT DOCUMENTS

| 6,068,664 | A | 5/2000 | Meyer et al. |
| 6,145,881 | A * | 11/2000 | Miller, III ........... B60R 22/1951 280/801.2 |
| 6,454,306 | B1 | 9/2002 | Cunningham et al. |
| 6,561,936 | B1 * | 5/2003 | Betz .................... B60R 22/1951 297/480 |
| 7,172,218 | B2 | 2/2007 | Nakano et al. |
| 7,823,924 | B2 | 11/2010 | Dewey et al. |
| 8,132,829 | B2 | 3/2012 | Sugiyama et al. |
| 8,226,122 | B2 * | 7/2012 | Lane, Jr. ............. B60R 22/1955 280/806 |
| 8,240,772 | B2 | 8/2012 | Kawata et al. |
| 8,419,057 | B2 | 4/2013 | Stevens et al. |

(Continued)

FOREIGN PATENT DOCUMENTS

| CN | 202243333 | 5/2012 |
| CN | 202243333 U | 5/2012 |

(Continued)

*Primary Examiner* — Keith J Frisby
(74) *Attorney, Agent, or Firm* — Mark David Torche; Patwrite Law (57) ABSTRACT

A belt pretensioner has a base member. The base member has an axial cavity within. An actuating member is hollow and fits within the axial cavity of the base member. The hollow actuating member telescopically slides within the axial cavity and an initiator fits within the hollow portion of the actuating member. In a critical situation such as a crash, the initiator is triggered and the expanding gasses move the actuating member. The actuating member is connected to seat belt webbing and this movement provides the necessary pretensioning of the seatbelt. In some embodiments, a locking means is used to prevent the belt pretensioner from loosening once triggered. One embodiment is provided for use with a child seat. A transversely mounted belt pretensioner embedment is also disclosed.

11 Claims, 12 Drawing Sheets

(56) References Cited

U.S. PATENT DOCUMENTS

| | | | |
|---|---|---|---|
| 8,528,987 B2 * | 9/2013 | Cahill | B60R 22/1955 |
| | | | 297/480 |
| 9,090,221 B2 | 7/2015 | Boughneer et al. | |
| 2006/0097506 A1 | 5/2006 | Stevens | |
| 2013/0175835 A1 | 7/2013 | Fujita et al. | |
| 2013/0193740 A1 * | 8/2013 | Brisighella | B60R 22/1955 |
| | | | 297/480 |

FOREIGN PATENT DOCUMENTS

| | | | | |
|---|---|---|---|---|
| EP | 1431137 A1 * | 6/2004 | | B60R 22/1952 |
| WO | WO 99/00275 A1 | 1/1999 | | |
| WO | WO 199000275 A1 | 1/1999 | | |
| WO | WO 01/92138 A1 | 12/2001 | | |
| WO | WO 2001092138 A1 | 12/2001 | | |

* cited by examiner

BELT PRETENSIONER

CROSS REFERENCE TO RELATED APPLICATIONS

This Application is a U.S. national stage entry from co-pending International Patent Application Ser. No. PCT/CN2015/074039, filed Mar. 11, 2015 which claims priority to U.S. provisional patent application 61/967,139, filed Mar. 11, 2014, the complete disclosures of each of which are hereby incorporated by reference.

FIELD OF THE INVENTION

The present invention relates generally to seatbelt restraint systems for motor vehicles, and more particularly, to a linear seatbelt pretensioner for a seatbelt restraint system.

BACKGROUND OF THE INVENTION

Most passenger vehicles use a 3-point seatbelt as safety harness for restraining the occupants in the vehicles. This harness has a up-side-down "Y" shaped configuration. It has 3 mounting points. The first point is outboard lap mount, or anchorage point, while the second point is inboard lap mount, or buckle point, and the third point is the shoulder point, or D-ring point.

Many prior arts have at least one linear pretensioner connected to anchorage point (usually called PLP), or buckle point (usually called PBP), or both of the seatbelt. Two of these prior arts are U.S. Pat. No. 8,132,829, and 7,172,218.

Typical PLPs or PBPs have a pyrotechnic charge that is fired when a collision occurs, producing expanding gas which pressurizes a gas chamber within a tube, which forces a piston down the tube. The piston is connected to the belt system by a cable or strap. Movement of the piston tightens or "pretensions" the belt against the occupant.

In order to retract the cable, the cable is connected to the piston and is pulled into the expanding gas chamber. Sealing the gas chamber around the flexible cable presents a difficult challenge.

U.S. Pat. Nos. 7,823,924, 8,528,987, and 9,090,221 have shown some so-called cable-free pretensioners presenting a better concept overcoming the sealing challenge listed above by eliminating the cable.

But this technology or other known prior arts are not effective at utilizing the space of gas generator (or initiator). In other words, the axial dimension of apparatus by these technologies cannot be less than the stacking up of these three elements: the axial length of initiator, the axial length of piston, and the travel of piston (or so called actuating profile).

SUMMARY OF THE INVENTION

A belt pretensioner has a base member. The base member has an axial cavity within. An actuating member is hollow and fits within the axial cavity of the base member. The hollow actuating member telescopically slides within the axial cavity and an initiator fits within the hollow portion of the actuating member. In a critical situation such as a crash, the initiator is triggered and the expanding gasses move the actuating member. The actuating member is connected to seat belt webbing and this movement provides the necessary pretensioning of the seatbelt. In some embodiments, a locking means is used to prevent the belt pretensioner from loosening once triggered. One embodiment is provided for use with a child seat. A transversely mounted belt pretensioner embedment is also disclosed.

Other features and advantages of the instant invention will become apparent from the following description of the invention which refers to the accompanying drawings.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

The following description is merely exemplary in nature and is not intended to limit the present disclosure or its application or uses.

Referring to FIGS. 1 through 5, FIG. 1 shows a schematic structure of a belt pretensioner 10 according to an embodiment of the present invention. Belt pretensioner 10 will be described using the following coordinates: z for up-down, x for fore-after, and y for cross-car direction in a vehicle (the z-axis may tilt a little bit forward around the y coordinate in actual application).

Figure 2:
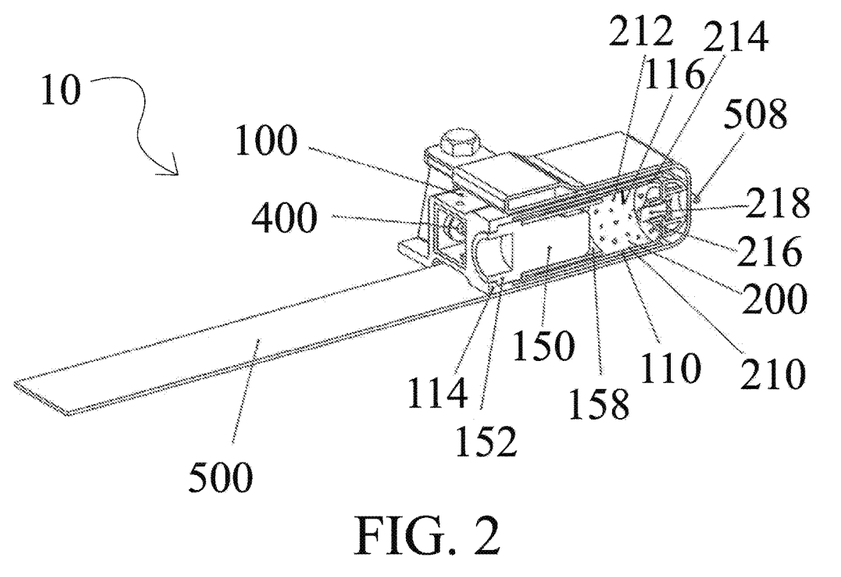
FIG. 2 is a cut-away view of the belt pretensioner shown in FIG. 1.

Belt pretensioner 10 comprises a base member 100, an initiator 150, and an actuating member 200. It may also have a locking means 400. FIG. 2 shows a 3D view with the section cut along the y-z plane and FIG. 3 shows an exploded view.

Figure 1:
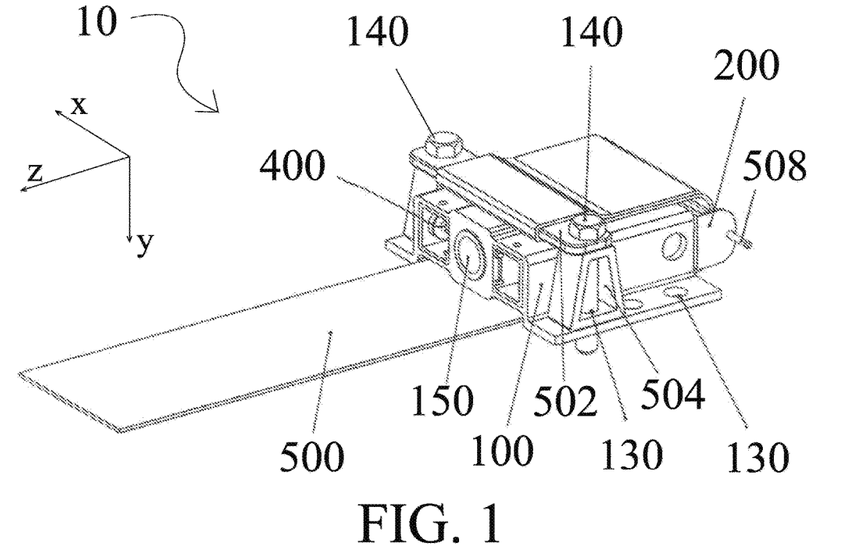
FIG. 1 is an isometric view of a belt pretensioner according to an embodiment of the invention.

Belt pretensioner 10 is connected using a free-end of a 3-point seatbelt to replace a conventional anchorage of the seatbelt, as described in the following paragraphs. Of course other seatbelt configurations are possible.

Base member 100 has an axial cavity 110 which passes through from the top to the bottom of base member 100. Axial cavity 110 is peripherally bounded by wall 116. Axial cavity 110 usually has a shoulder 114 at its top. Base member 100 usually has at least one auxiliary tunnel 120 usually parallel to axial cavity 110. Base member 100 usually also has at least one hole 130 which is fixed to a seat 600 or a body structure (not shown) of a vehicle (not shown) through at least one fastener 140. Base member 100 may also have at least one hole 126 for locking engagement function discussed soon. Base member 100 is made from extruded aluminum; however, any suitable material and manufacturing processes may be used.

Figure 3:
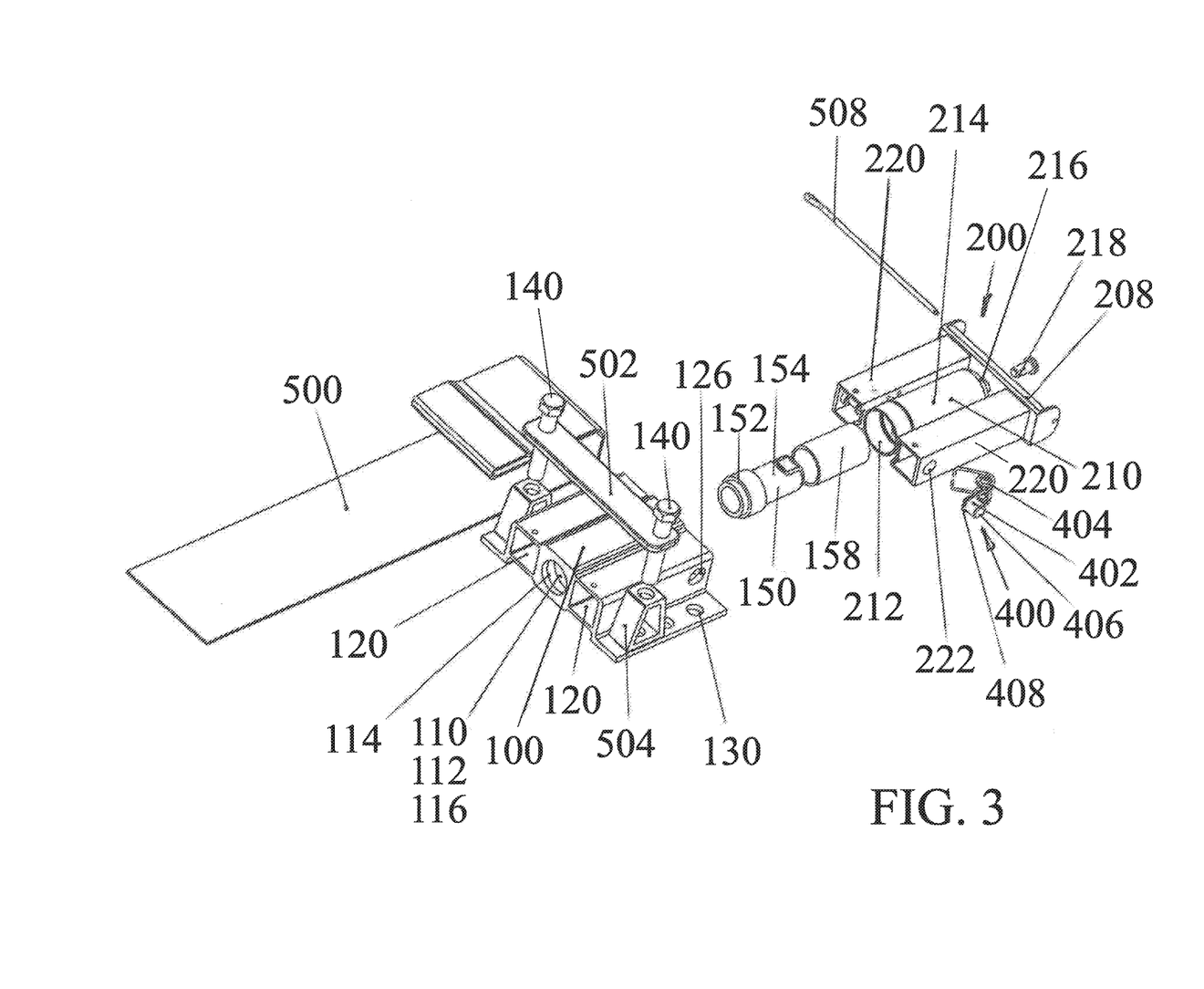
FIG. 3 is an exploded view of the belt pretensioner shown in FIG. 1.

As seen in FIG. 3, actuating member 200 has an actuating body 210 that telescopically interacts with axial cavity 110. Unlike other conventional actuating bodies, which is usually a solid piston, actuating body 210 is a hollow cylinder having a one end open and the other end closed. Actuating body 210 has a cavity 212 that encompasses initiator 150. In other terms, initiator 150 is enveloped by a shank wall 214 and bottom end 216 of actuating body 210 in an un-deployed situation. Actuating member 200 can also have an actuating profile 208, and can also have at least one auxiliary tube portion 220, which is engaged with auxiliary tunnel 120.

Initiator 150 is secured with a top end 112 that is ideally airtight. More specifically, a axial shoulder 114 of axial cavity 110 engages with an initiator shoulder 152 of initiator 150. The lower end is the only exit for air fluid communication for axial cavity 110, and is closed by actuating body 210 of actuating member 200. Actuating member 200 can be moved in and out (meaning up and down) telescopically along the axial direction of axial cavity 110, which allows belt pretensioner 10 to maintain a basically air tight condition throughout use (or to maintain a condition of being as air tight as possible throughout use.)

In other words, base member 100, actuating member 200 and initiator 150 overlap with each other along their axial direction in the un-deployed geometry, while initiator 150 resides in the center and is enveloped by actuating body 210, and by base member 100. In their radial dimension, initiator 150 is the smallest of three, and usually cavity 110 of base member 100 is bigger than actuating body 210 of actuating member 200, but also work if their sizes are reversed. A belt webbing 500 can be attached to actuating profile 208 of actuating member 200 and tensioned directly by actuating profile 208.

In an embodiment of the present invention, webbing 500 is first fixed to an outboard side of base member 100 through a cross member 502 and two spacers 504, and folded back around the bottom of actuating profile 208 of actuating member 200, then U-turned to the inboard side of base member 100, then extended back upward toward to buckle side. With this setting, actuating member 200 is not fixed with webbing 500 directly, but essentially operates like a movable pulley on webbing 500. Actuating profile 208 plays the role of the movable pulley. Thus, the linear travel of the main body of webbing is approximately twice the travel of actuating member 200 (FIG. 4).

Base member 100 usually has a hole, or opening 130, with which base member 100 can be fixed with a seat or vehicle structure (not shown) directly with fastener 140. In practice, belt pretensioner 10 can act on any location of the seatbelt routing, but typically acts on the location of the anchorage.

Figure 4:
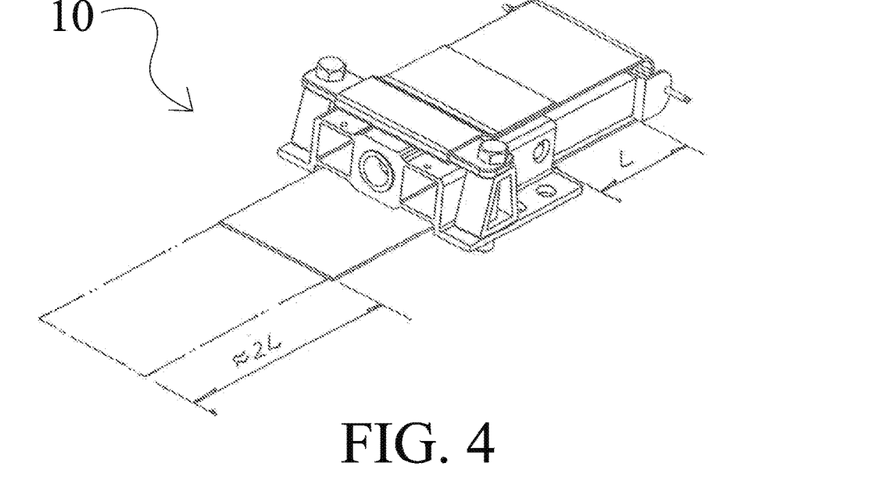
FIG. 4 is an isometric view of the belt pretensioner shown in FIG. 1 after it has been fully actuated.
Figure 5:
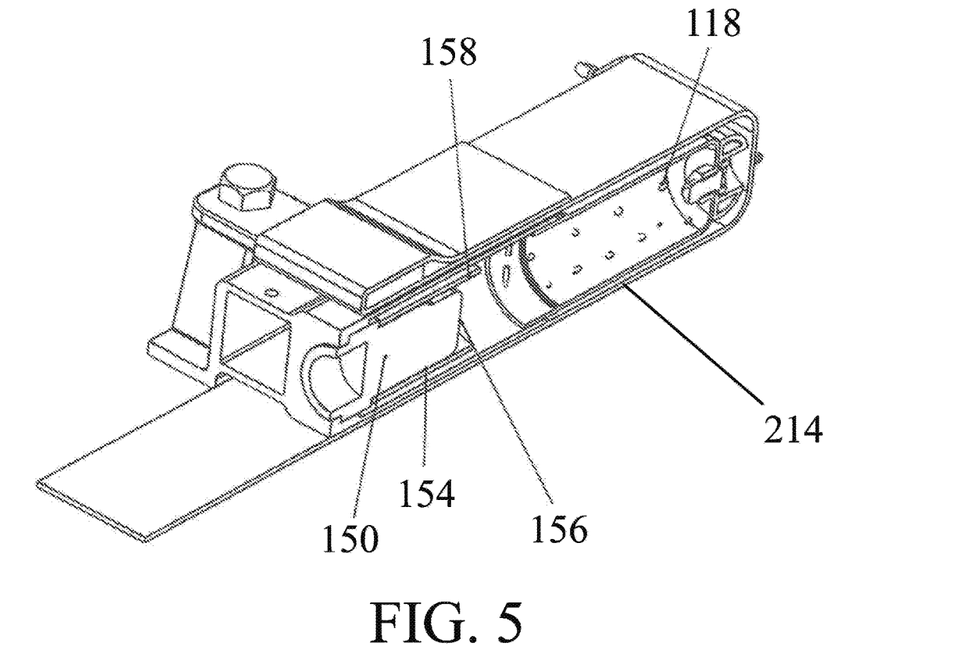
FIG. 5 is a cut-away view of the fully actuated belt pretensioner shown in FIG. 4.

Comparisons between FIGS. 1 and 4, and between FIGS. 2 and 5 show how webbing 500 is tightened. When initiator 150 is fired, high-pressure gases 118 are generated by initiator 150 and moves actuating member 200 downward a distance L, which in turn moves the main webbing section through the U-turn approximately twice the distance of L (2L), therefore tightening the belt as shown in FIGS. 4 and 5.

When initiator 150 is fired, a bottom end 156 of initiator 150 (FIG. 5) is broken by erupting high pressure gas 118. Sometimes a shank wall 154 of initiator 150 also expands significantly, which may grip shank wall 214 to stop or retard the telescoping movement of actuating member 200. Therefore, a restraint tube 158 can be added between shank wall 154 of initiator 150 and shank wall 214 to separate their direct contact.

FIGS. 1 and 3 show that locking means 400 can be added between base member 100 and actuating member 200. As seen in FIG. 3, in this embodiment, a pin 402 is slidably engaged with a basically laterally oriented hole 222 on auxiliary tube portion 220. Pin 402 can be installed in auxiliary tube portion 220 through its cavity, and a spring 404 is added inside the cavity of auxiliary tube portion 220 to push pin 402 away unless a top 406 of pin 402 touches the inside wall of auxiliary tunnel 120.

After actuating member 200 is actuated and telescoped to some extent, pin 402 will engage with an auxiliary tunnel hole 126 of auxiliary tunnel 120, meaning that pin 402 will move away a little bit more unless a locking means shoulder 408 touches the edge of hole 222. When pin 402 is engaged with auxiliary tunnel hole 126, actuating member 200 is locked with said base member 100, meaning that it cannot be telescoped out or retreat back, which retains the tightened condition the webbing after actuation.

Instead of being attached to actuating member 200 as illustrated above. Said locking means 400 can also be attached to base member 100, similar to locking means of most height adjusters available in the seatbelt market today.

Actuating profile 208 can be detachable, and then be fixed to actuating body 210 by a fastener 218. A cotter pin 508 can be fixed with actuating profile 208 to hold a u-turn section of webbing 500 for reducing slack in webbing 500.

Since sparks may be produced from gaps both at the top and bottom of axial cavity 110 when initiator 150 is fired, a fire-retardant coating can be added on the surfaces of webbing 500 near belt pretensioner 10. Another option provides a sheet of foil or other thin fire isolating sheet added between webbing 500 and belt pretensioner 10.

Figure 6:
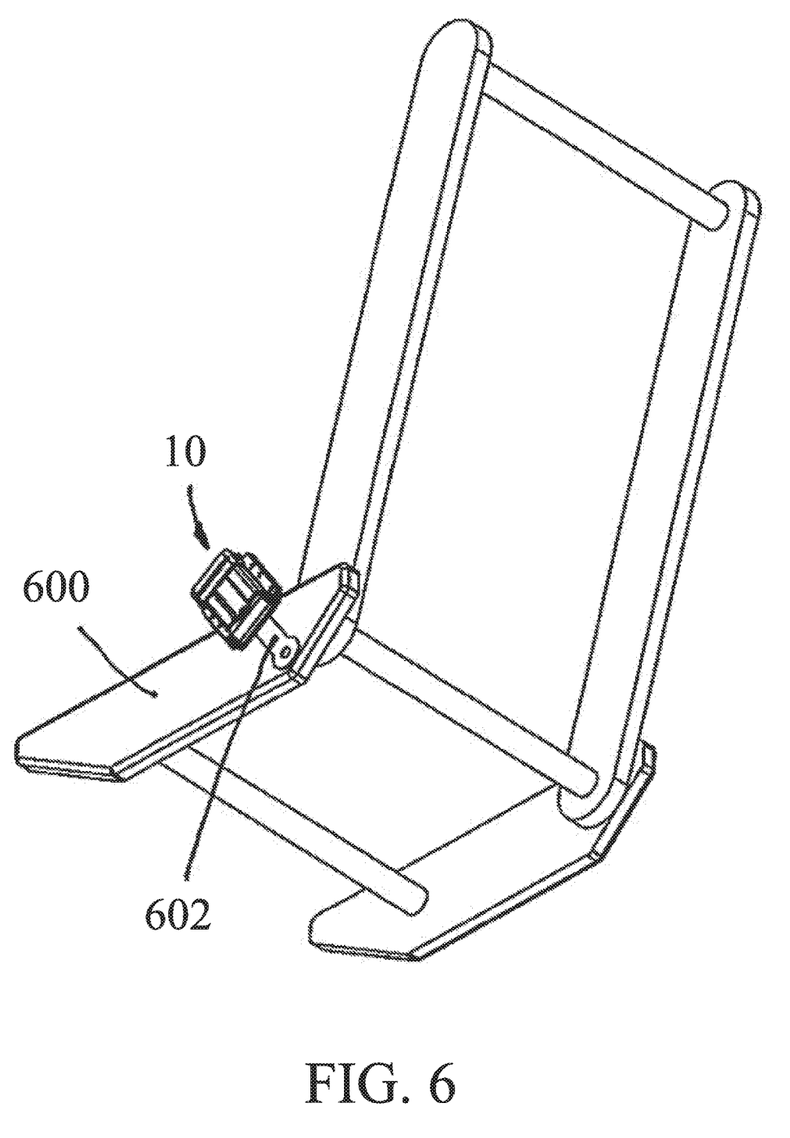
FIG. 6 is an illustration of the belt pretensioner attached to a seat.

Another embodiment is shown in FIG. 6 in which belt pretensioner 10 is not directly fixed to a seat 600, but through a media bracket 602 in between.

Figure 7:
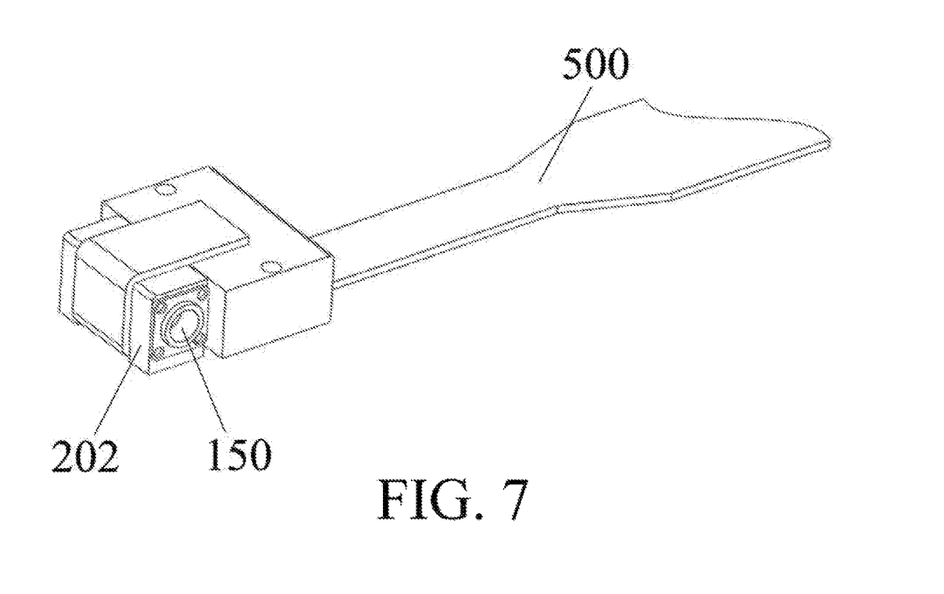
FIG. 7 is an isometric view of a belt pretensioner according to an embodiment of the invention.
Figure 8:
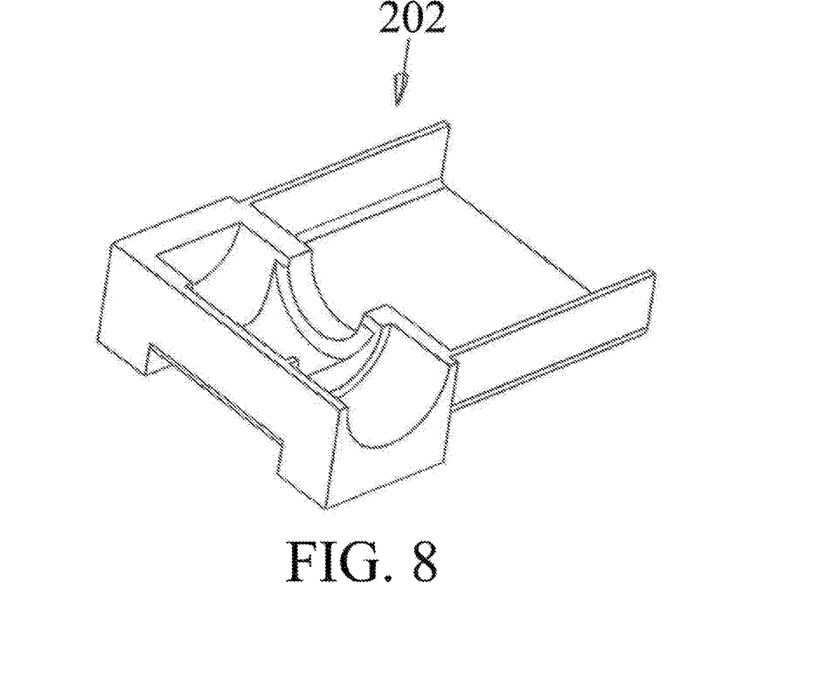
FIG. 8 is an illustration of the internal structure of a moveable member of the belt pretensioner shown in FIG. 7.

The embodiment shown in FIGS. 7 and 8, laterally mounts initiator 150 to an actuating member 202. FIG. 8 shows the internal structure actuating member 202. Webbing 500 is shown having a narrowed end in this embodiment.

Figure 9:
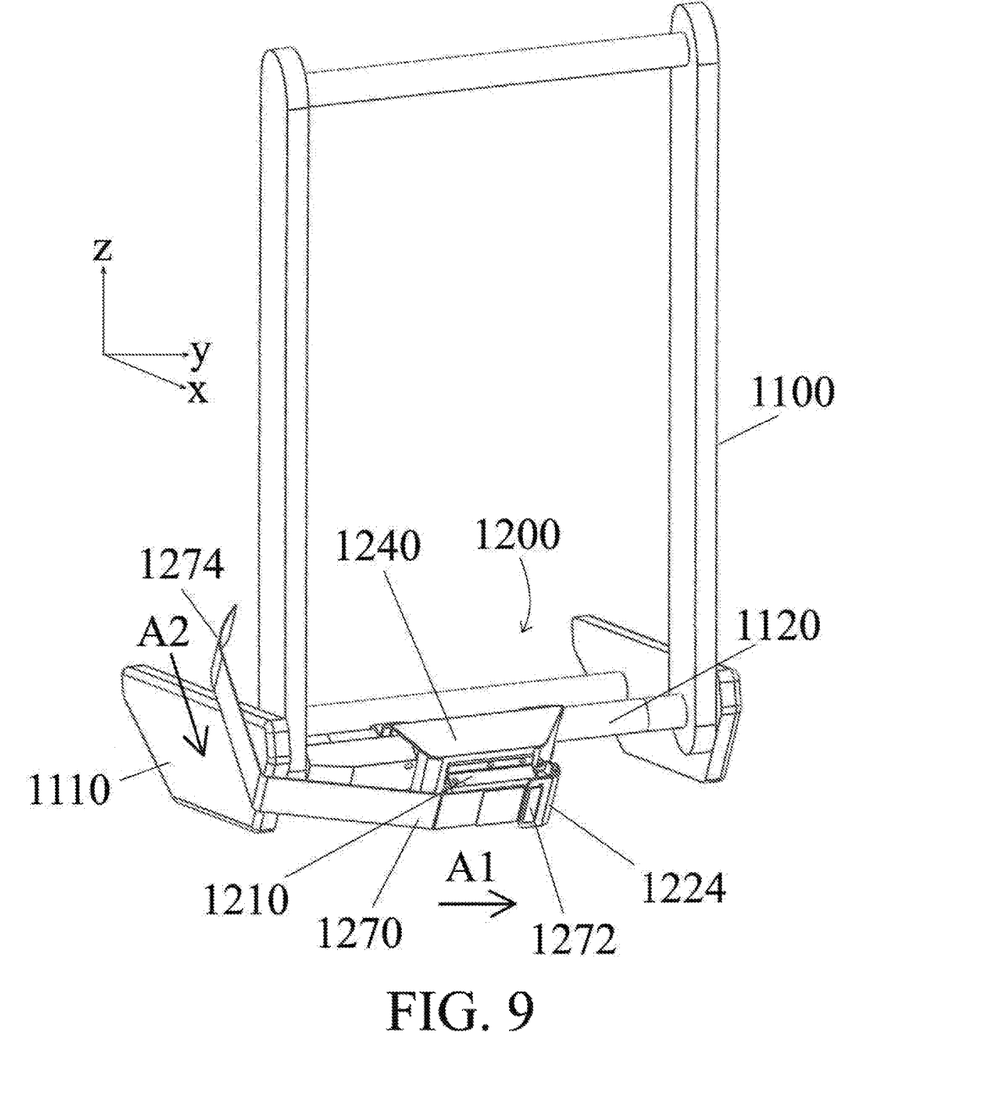
FIG. 9 is an illustration of a belt pretensioner mounted to a seat according to an embodiment of the invention.
Figure 10:
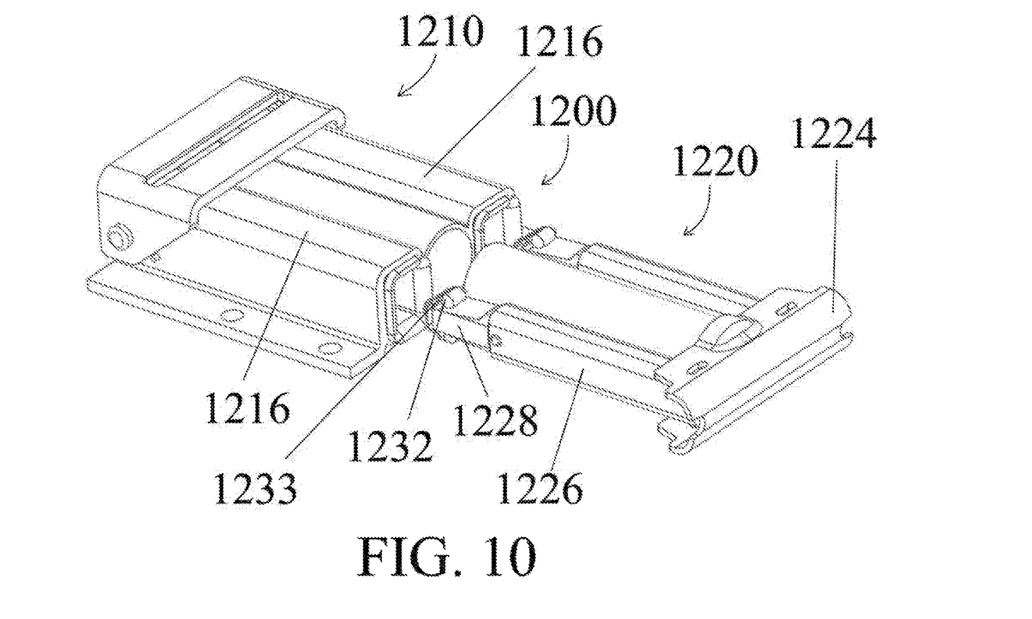
FIG. 10 is an isometric view of the belt pretensioner shown in FIG. 9.

Referring now to FIGS. 9 and 10, an embodiment is illustrated in which a belt pretensioner 1200 is shown in different orientation and location. Belt pretensioner 1200 is generally orientated along the y-axis (cross-car direction) of the car. A seat 1100 has a side frame 1110 and a cross member 1120. Belt pretensioner 1200 is secured to cross member 1120 directly, or through a media member 1240.

Referring to FIG. 10, pretensioner 1200 has a base member 1210 and a movable member 1220. The locking means in this embodiment utilizes a linear one-way clutch.

A locking wedge portion 1228 is fixed to a first end of auxiliary tube portion 1226 of movable member 1220, and a locking member (a roller) 1232 is installed between locking wedge portion 1228 and an inside wall of an auxiliary tunnel 1216 of a base member 1210. A retainer 1233 prevents locking member 1232 from rolling out.

Figure 11:
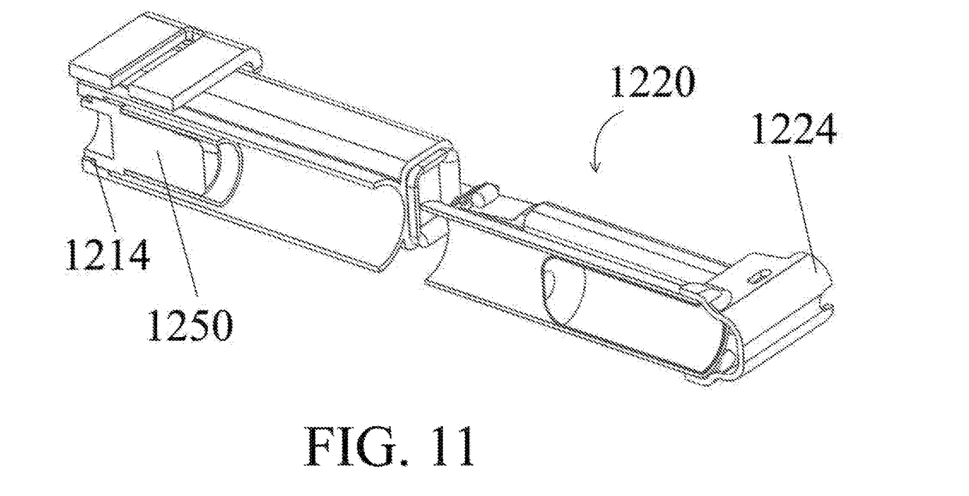
FIG. 11 is a cut-away view of the belt pretensioner shown in FIG. 10.

In a critical situation, such as a frontal crash, a firing signal will fire initiator 1250 (FIG. 11) at the location between base member 1210 and movable member 1220 which drives movable member 1220 to the right in a direction shown as A1 in FIG. 9. An anchorage end 1272 of a seatbelt webbing 1270 is fixed with movable member 1220 through a bracket 1224, and this movement pulls anchorage end 1272 in direction A1, which in turn pulls the next section in a direction A2 which pretensions the belt portion crossing the abdomen of the occupant (not shown).

During a frontal crash, the occupant moves forward with respect to the vehicle and the seat, the seatbelt will try to move movable member 1220 in the direction opposite to that of pretensioning, especially after the pretensioning, and the one-way clutch, as discussed above, will stop any loosening shortly after overcoming a small amount of free play.

Figure 12:
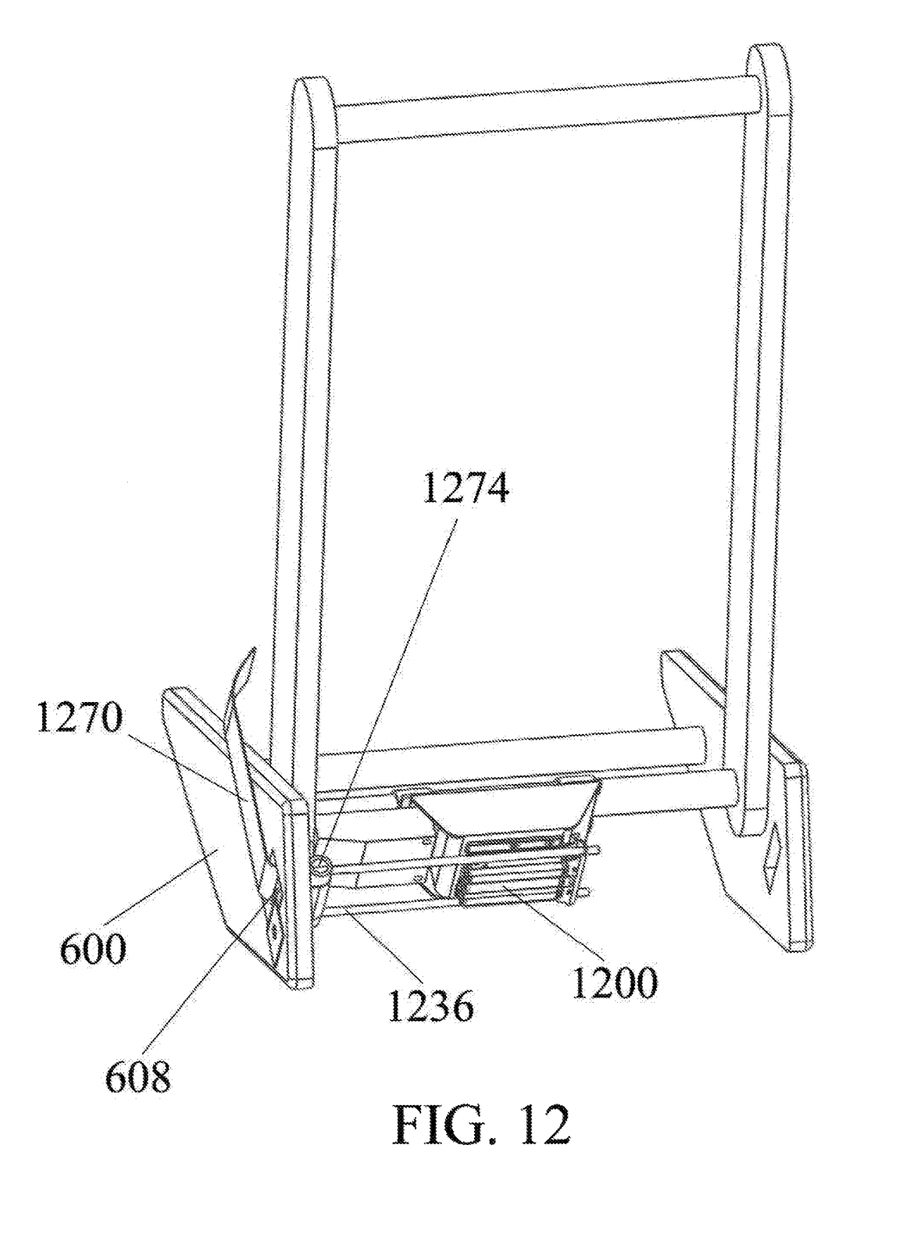
FIG. 12 is an illustration of a belt pretensioner that uses a bracket and mounted to a seat according to an embodiment of the invention.
Figure 13:
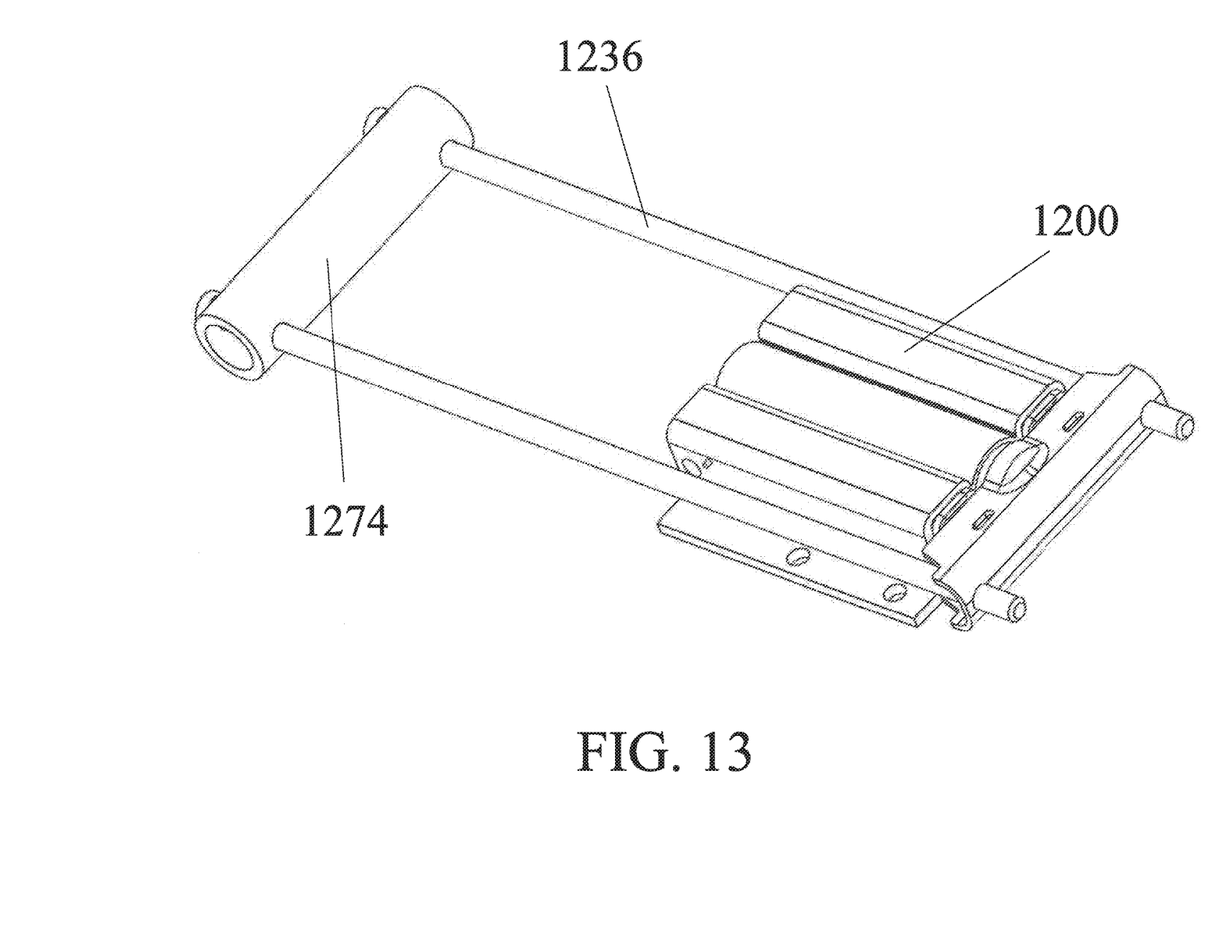
FIG. 13 is an isometric view of the belt pretensioner and bracket shown in FIG. 12.

Now referring to FIGS. 12 and 13, the free end of webbing 1270 is fixed with seat 600 and webbing 1270 enters a hole 608 on seat 600, then makes a U-turn and returns to the main routing towards to the buckle side of seat 600. The U-turn section of webbing 1270 wraps around a cross-tube portion 1274 of a bracket 1236, which is fixed to movable member 1200.

Figure 14:
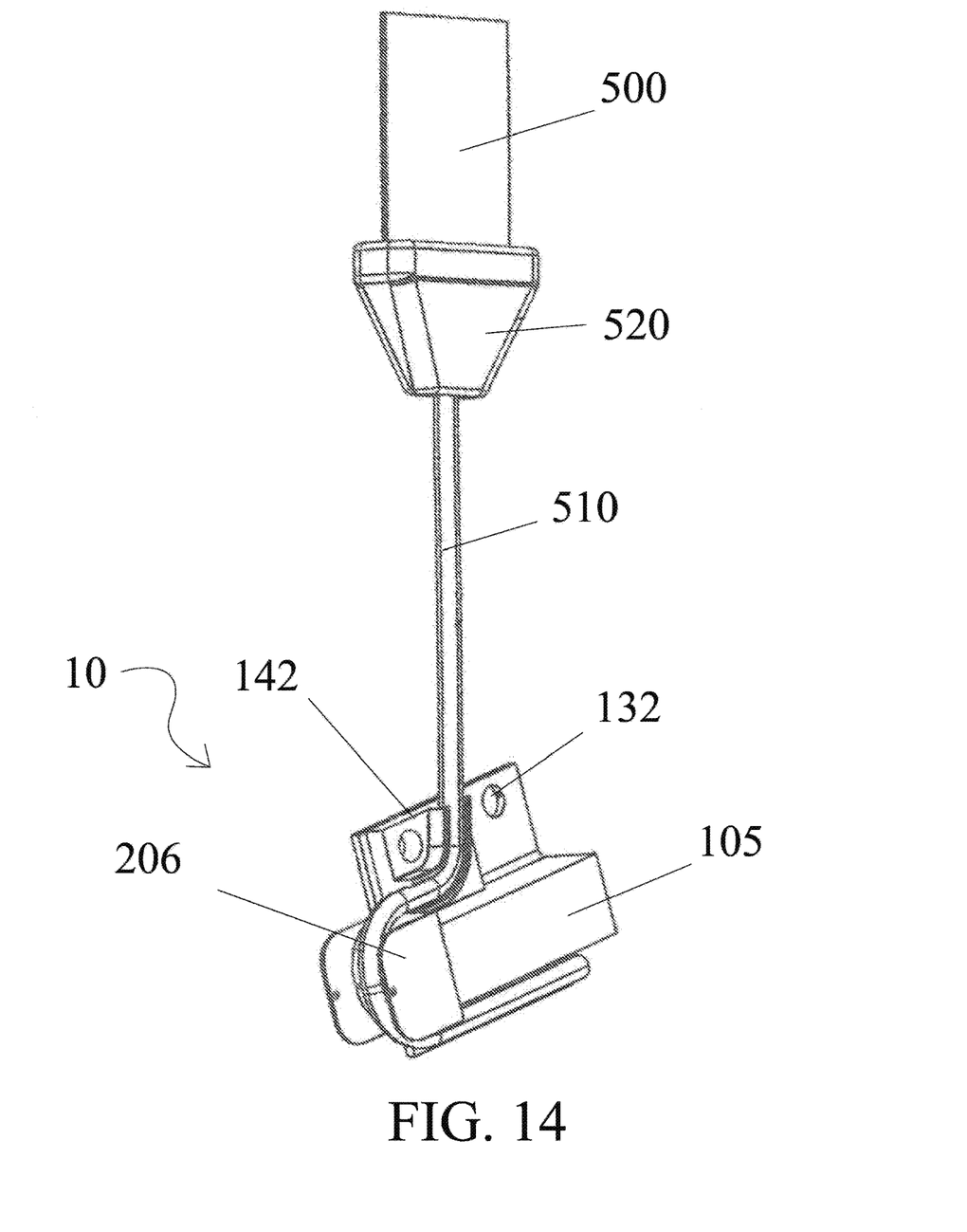
FIG. 14 is an isometric view of a belt pretensioner attached to a cable according to an embodiment of the invention.
Figure 15:
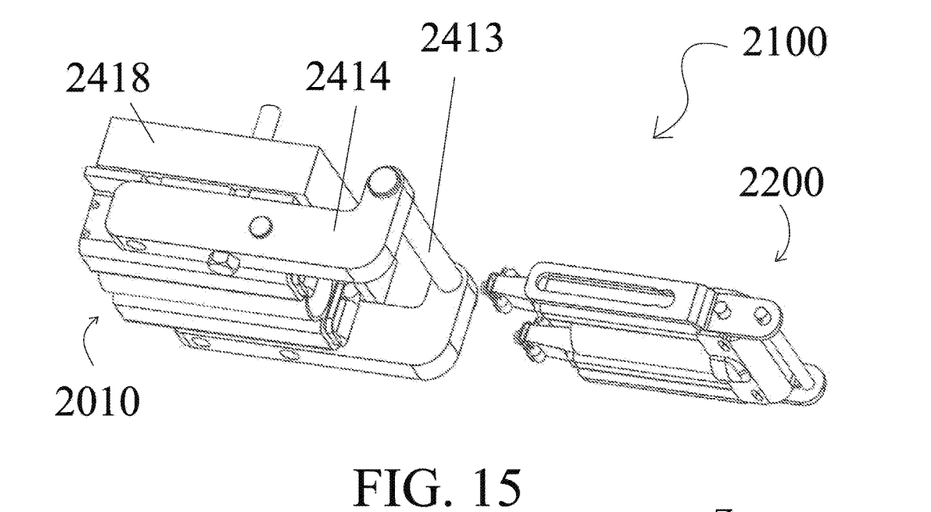
FIG. 15 is an isometric view of a belt pretensioner according to an embodiment of the invention.

Referring now to FIG. 14, belt pretensioner 10 is shown having a base member 105, an actuating member 206, a cable 510, a connector 520, and webbing 500. It is installed in a typical prior art configuration, but the tube, or base member of this invention is much shorter compared with prior art. Belt pretensioner 10 is secured to the vehicle through an opening 132. A free end of cable 510 is fixed to a lower side of base member 105 by wrapping around actuating member 206 forming a U-turn. An upper portion of cable 510 is guided by a cable guide 142 and then routed upward to connector 520 which joins webbing 500.

In this embodiment, connector 520 can be replaced by a conventional seatbelt buckle, which is engaged to a latch plate slidably connected to a middle section of webbing 500. In this case, belt pretensioner 10 plays the role of PBP. Cable 510 can be replaced by a media webbing (not shown) when belt pretensioner device 10 plays the role of PBP in seats other than the first row.

Referring now to FIGS. 15 through 19, a belt pretensioner 2100 is shown applied to a child seat 2310. Child seat 2310 has a back portion 2314 and cushion portion 2312. Child seat 2310 is oriented in a rear facing situation in this case for later illustration.

The typical situation of routing an independent seatbelt for use with a child seat (usually called child restraint system or CRS) is known in the art; (such as U.S. Pat. No. 8,240,772B2, and US20130175835A1). It usually has what is called 5-point configuration. These 5 points of CRS converge to a single point at a front connector. Between these 5 points and the converged point of front connector, two shoulder portions, two abdomen portions and an adjustment portion are formed. A webbing 2500 has a proximal end 2502 for adjusting the length to fit with various sizes of child occupants. Proximal end 2502 is usually located between upper legs of a child occupant and is usually locked after adjustment. The adjustment portion usually has a "L" shape having a bottom sub-portion and a back sub-portion. The pretensioner 2100 can be applied at each of these sub-portions, or at their turning location. For a better understanding, the following paragraph describes how the pretensioner 2100 is applied at the location of bottom sub-portion.

Figure 17:
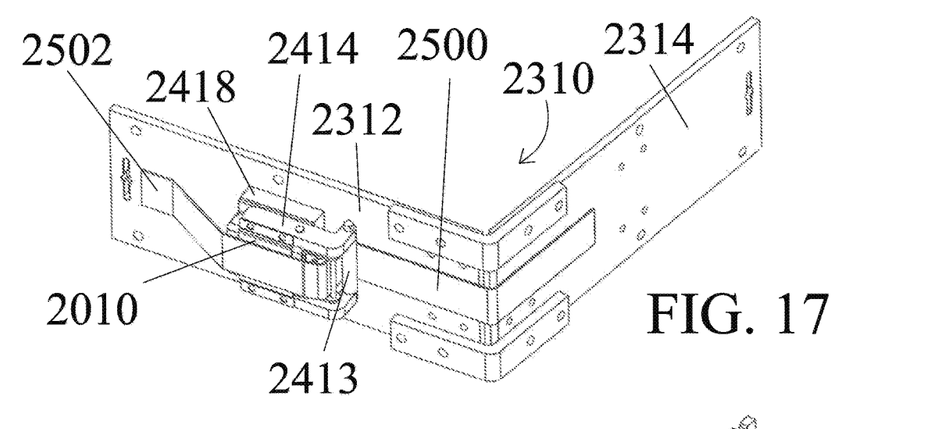
FIG. 17 is an isometric view of the belt pretensioner shown in FIG. 15 attached to a child seat.
Figure 18:
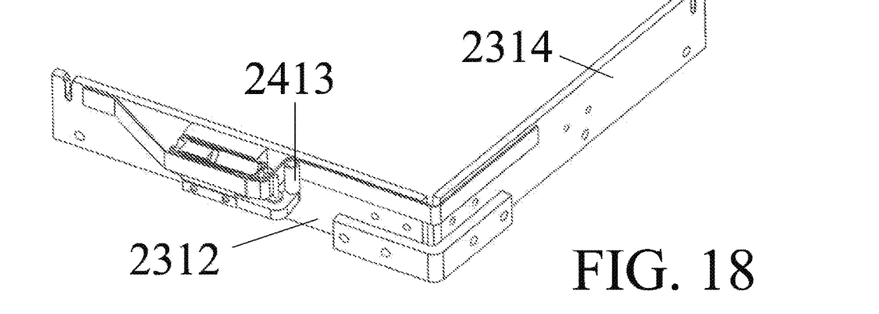
FIG. 18 is a cut-away view of the belt pretensioner shown in FIG. 17.

A belt pretensioner 2100 has a base member 2010 and a movable member 2200. Webbing 2500 is shown with proximal end 2502 of webbing 2500 routed beneath base member 2010, towards the direction of back portion 2314, then going up and then turning about 90 degrees by routing pin 2413. Routing pin 2413 is connected to cushion portion 2312 with a bracket 2414.

A spacer 2418 may be used to create space for routing pin 2413 when inserted between base member 2010 and cushion portion 2312. After passing around routing pin 2413, webbing 2500 is routed toward the back side of back portion 2314, then turns about 90 degrees and runs up to be connected to a back connector (not shown) which is connected to two shoulder portions of webbing 2500.

Figure 19:
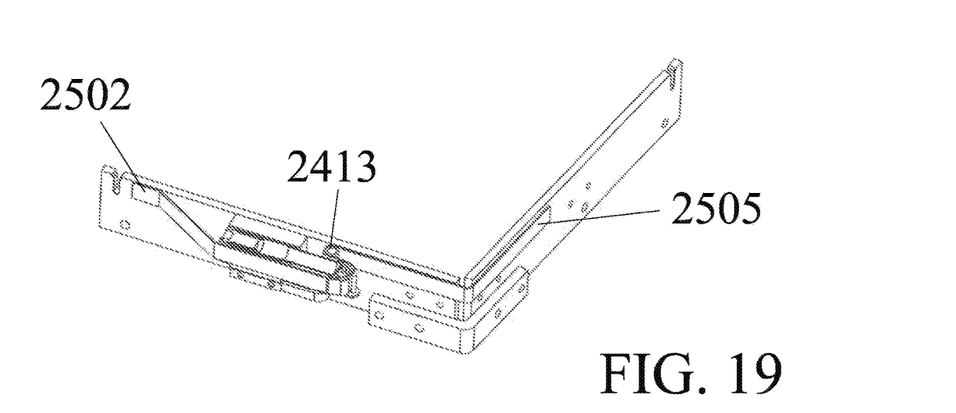
FIG. 19 is a cut-away view of the belt pretensioner shown in FIG. 18 after activation.

FIG. 19 shows the situation after belt pretensioner 2100 is fired, moveable member 2200 is pushed outward from base member 2010 which forces webbing 2500 to form a "Z" shaped portion. Since proximal end of 2502 and pin 2413 are fixed, the distal end 2505 and the back connector are then pulled down, then the two shoulder portions (not shown, but known in the art) of webbing 2500 are tensioned.

Figure 16:
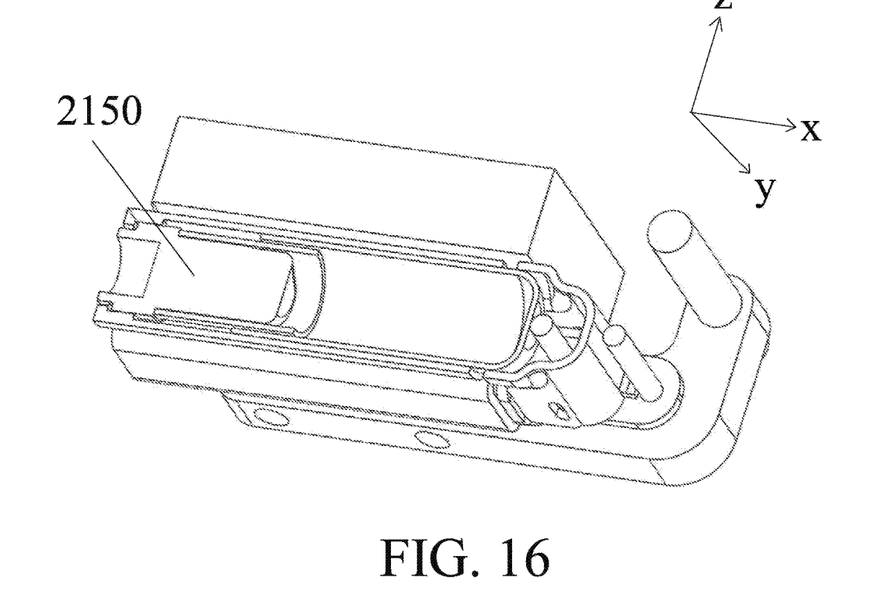
FIG. 16 is a cut-away view of the belt pretensioner shown in FIG. 15.

An initiator 2150 is connected by harness to a battery of the vehicle, or an independent battery installed in the child seat. As is known in the art, an inertia sensor (can be a ball-in-tube style) and a control unit can be connected to the related circuit for deciding the fire condition.

The present invention 10 can also be applied to what is called 4-point seatbelt system, which can be seen at vehicles for special purposes, such as fire fighting vehicles, race-cars or even airplanes, or fast-boats. This 4-point seatbelt is almost the same as a 5-point seatbelt, with the main difference being the elimination the adjustment portion, or bottom portion of the seatbelt webbing Although the instant invention has been described in relation to particular embodiments thereof, many other variations and modifications and other uses will become apparent to those skilled in the art.

What is claimed is:

1. A belt pretensioner for use in a belt restraint system comprising:
   a hollow base member;
   said hollow base member having a longitudinally disposed cavity therein;
   said cavity having a walled portion;
   an actuating member having an actuating body;
   said actuating body having a shape selected and adapted for telescopic movement within said longitudinally disposed cavity;
   said base member and said actuating body forming a variable length chamber therein;
   an initiator;
   said initiator fixedly disposed within said variable length chamber;
   at least one longitudinal auxiliary portion;

said at least one longitudinal auxiliary portion being essentially adjacent to and attached to said actuating body; and at least one auxiliary tunnel being essentially adjacent to and attached to said walled portion and adapted to telescopically interact with said at least one longitudinal auxiliary portion.

2. The belt pretensioner for use in a belt restraint system according to claim 1 further comprising:

a locking means disposed between said base member and said actuating member for stopping said telescopic movement.

3. The belt pretensioner for use in a belt restraint system according to claim 1 wherein said locking means comprises:

a laterally oriented hole disposed on said at least one longitudinal auxiliary portion;

an auxiliary tunnel hole disposed on said at least one auxiliary tunnel adapted to align with said laterally oriented hole when in a maximum position;

a pin slidably engaged with said laterally oriented hole; and a spring to bias said pin against an inside wall of said auxiliary tunnel.

4. The belt pretensioner for use in a belt restraint system according to claim 1 wherein said locking means is a one-way clutch further comprising:

a locking wedge portion disposed on an end of said at least one longitudinal auxiliary portion; and at least one locking element biased and attached to said end.

5. The belt pretensioner for use in a belt restraint system according to claim 4 wherein said locking element is a roller.

6. The belt pretensioner for use in a belt restraint system according to claim 4 further comprising a retainer attached to a matching end of said at least one auxiliary tunnel whereby said at least one locking element is prevented from leaving a proper position.

7. The belt pretensioner for use in a belt restraint system according to claim 1 wherein said belt pretensioner is mounted beneath the bottom of a seat, said actuating member being deployed in a cross-car direction.

8. The belt pretensioner for use in a belt restraint system according to claim 1 wherein said belt pretensioner is mounted behind the back of a seat, said actuating member being deployed in a cross-car direction.

9. The belt pretensioner for use in a belt restraint system according to claim 1 wherein said base member is basically made by means of aluminum extrusion.

10. The belt pretensioner for use in a belt restraint system according to claim 1 wherein said actuating body is hollow which circumferentially covers said initiator.

11. A belt pretensioner for use in a belt restraint system comprising:

a hollow base member;

said hollow base member having a longitudinally disposed cavity therein;

said cavity having a walled portion;

an actuating member having an actuating body;

said actuating body having a shape selected and adapted for telescopic movement within said longitudinally disposed cavity;

said base member and said actuating body forming a variable length chamber therein;

an initiator;

said initiator fixedly disposed within said variable length chamber;

said actuating member also having at least one longitudinal auxiliary portion being essentially adjacent to and attached to said actuating body; and said hollow base member also having at least one auxiliary tunnel being essentially adjacent to said longitudinally disposed cavity and adapted to telescopically interact with said at least one longitudinal auxiliary portion.

* * * * *